United States Patent [19]

Murabayashi et al.

[11] 4,083,718
[45] Apr. 11, 1978

[54] BISMUTH-TIN-INDIUM-LEAD ALLOY

[75] Inventors: Hideki Murabayashi, Kawasaki; Katsuhiko Kawakita, Yokosuka; Kisaku Nakamura, Funabashi; Sadao Kobatake, Yokohama, all of Japan

[73] Assignee: Tokyo Shibaura Electric Co., Ltd., Tokyo, Japan

[21] Appl. No.: 668,447

[22] Filed: Mar. 19, 1976

[30] Foreign Application Priority Data

Mar. 20, 1975  Japan .................................. 50-32939

[51] Int. Cl.² ....................... C22C 13/02; C22C 30/04
[52] U.S. Cl. .............................. 75/134 B; 75/134 D; 75/175 A; 176/86 M
[58] Field of Search ................... 75/63, 77, 78, 79, 85, 75/134 R, 134 N, 134 B, 134 D, 134 T, 166 B, 166 C, 175 R, 175 A; 176/79, 87, 88, 86

[56] References Cited

U.S. PATENT DOCUMENTS

| 2,117,282 | 5/1938 | Austin | 75/175 A |
| 2,636,820 | 3/1953 | Bolton | 75/175 R |
| 2,649,367 | 8/1953 | Smith et al. | 75/134 T |
| 2,649,368 | 8/1953 | Smith et al. | 75/134 T |
| 2,649,369 | 8/1953 | Smith et al. | 75/134 T |
| 3,269,735 | 8/1966 | Whittaker | 176/79 |

FOREIGN PATENT DOCUMENTS 48-39694   11/1973   Japan.

Primary Examiner—L. Dewayne Rutledge
Assistant Examiner—Michael L. Lewis
Attorney, Agent, or Firm—Finnegan, Henderson, Farabow and Garrett

[57] ABSTRACT

Disclosed is a bismuth-tin-indium-lead alloy consisting essentially of 28 to 72 weight % of bismuth, 25 to 52 weight % of tin, 2 to 12 weight % of indium and 1 to 8 weight % of lead. This alloy has excellent sealing property and oxidation resistance, and is suitable particularly to the use as a seal material for a rotating plug of a nuclear reactor.

2 Claims, 2 Drawing Figures

F I G. 1
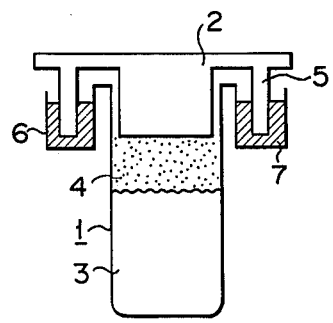
F I G. 2
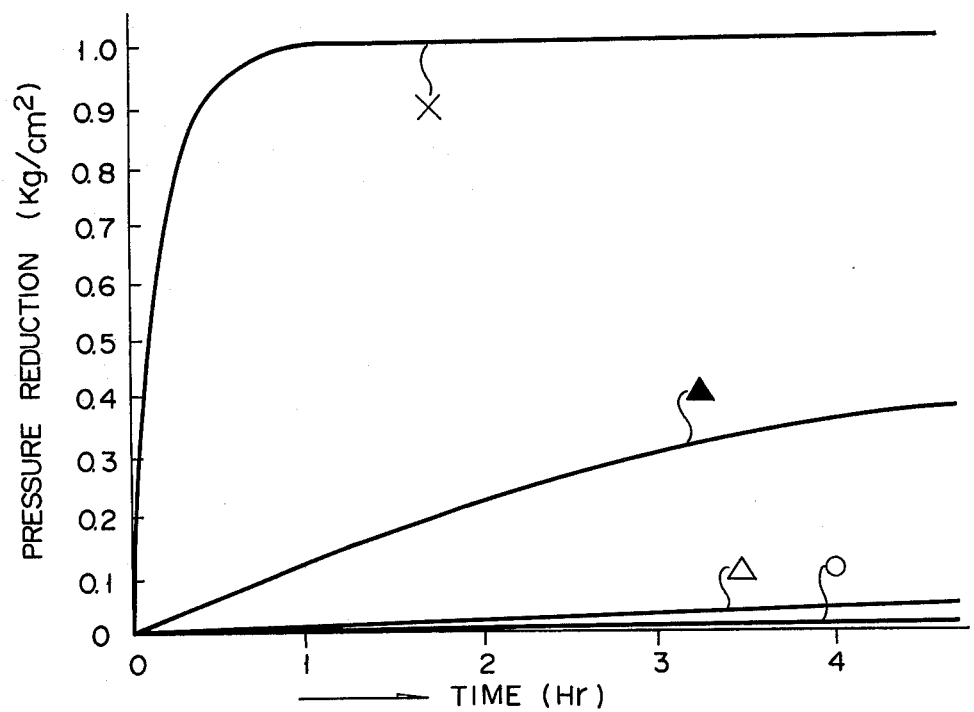

BISMUTH-TIN-INDIUM-LEAD ALLOY

BACKGROUND OF THE INVENTION

This invention relates to an alloy having a low melting point usable as a seal material for a metal-made vessel such as a vessel formed of stainless steel, and more particularly to a Bi-Sn-In-Pb alloy.

Conventionally, an alloy having a low melting point is employed as a seal material for use in a metal-made vessel such as a vessel formed of stainless steel. For example, a rotating plug 2 of a reactor vessel 1 shown in FIG. 1 is required to be sealed for purpose of preventing the leakout into the atmosphere of a cover gas 4 having radio activity covering the upper surface of a coolant 3 within the reactor vessel 1. The sealing of the rotating plug 2 is effected by providing a circular blade 5 attached to an edge portion of the plug 2, respectively and immersing this Blade within a trough 6 in which is received a fusible seal material 7 consisting of a low-melting alloy.

A Bi-Sn eutectic composition alloy (Bi 57 weight %, Sn 43 weight %) is conventionally known as a seal material. This alloy has no good sealing property. Further, a fusible seal material is also known whose melting point, i.e., solidification starting point is reduced to 100° C or less by adding a large amount of In to the Bi-Sn eutectic composition alloy. This alloy has a Bi-Sn-In proportion of 60 to 64 weight %, 17 to 21 weight % and 17 to 21 weight %, respectively and a solidification starting point of 79° to 89° C, and has degraded sealing property and low oxidation resistance, and in addition uneconomically requires a large amount of In. Further, a Bi-Sn-In-Pb alloy is also known which is prepared by adding Pb to a Bi-Sn-In alloy. This alloy has a Bi-Sn-In and Pb proportion of 58 to 62 weight %, 21 to 25 weight %, 4 to 8 weight % and 9 to 13 weight %, respectively. This alloy has improved oxidation resistance but no good sealing property. Assume now that a Bi-Sn-In alloy or a Bi-Sn-In-Pb alloy having said proportion be used as a seal material for sealing the rotating plug 2 of the reactor vessel 1 shown in FIG. 1. Upon performing the rotation operation of the rotating plug 2, the seal material 7 is molten while during a normal operation of the reactor vessel the seal material 7 is solidified to fixedly hold the plug 2 in place. Since, in this case, the seal material 7 exhibits no sufficient degree of sealing property when having been solidified, a complete sealing of the plug 2 during the reactor vessel operation can not be expected. Further, during a period in which the seal material 7 is molten, that is, during the plug rotation, the seal material 7 is oxidized, for which reason the composition of the seal material is varied to decrease the reliability upon a condition in which the cover gas 4 within the reactor vessel 1 is sealed. Under such circumstances, there has been a demand for an inexpensive seal alloy material having excellent sealing property and oxidation resistance, and simultaneously high fluidity.

SUMMARY OF THE INVENTION

An object of the invention is to provide a Bi-Sn-In-Pb alloy which is low in manufacturing cost and excellent in terms of sealing property and oxidation resistance and fluidity.

Another object of the invention is to provide a Bi-Sn-In-Pb alloy having a melting point or solidification starting point of about 95° to 150° C.

Still another object of the invention is to provide a Bi-Sn-In-Pb alloy for use as a fusible seal material for sealing a rotating plug of a reactor vessel.

Other objects and advantages will become apparent from the following detailed description and claims.

According to the invention, there is provided a Bi-Sn-In-Pb alloy consisting essentially of 28 to 72 weight % of Bi, 25 to 52 weight % of Sn, 2 to 12 weight % of In and 1 to 8 weight % of Pb, or more preferably a Bi-Sn-In-Pb alloy consisting essentially of 31 to 72 weight % of Bi, 25 to 52 weight % of Sn, 2 to 12 weight % of In, and 1 to 5 weight % of Pb.

BRIEF DESCRIPTION OF THE DRAWING

FIG. 1 is a sectional view of a reactor vessel, showing the condition wherein an alloy according to the invention is applied as a sealing material for a rotating plug of the reactor vessel; and FIG. 2 is a graph showing the result of a gas-leak test in correlation to the measured result obtained by color-check method.

DETAILED DESCRIPTION OF THE INVENTION

Preferred embodiments of the invention are hereinafter explained while they are being compared with controls.

Samples of a Bi-Sn-In-Pb alloy having a wide variety of proportions were prepared, and the sealing property and oxidation resistance of the individual samples were determined in accordance with the following tests.

TEST OF SEALING PROPERTY

This test was carried out in accordance with the following two methods. Generally, the sealing property of a metal seal has a tendency to become lower under a solid condition than under a liquid condition. Therefore, the test was performed under a solid condition with respect to all samples. The test was conducted under the condition of the sample thickness being 10 mm.

1. Color check method

First, in order to model an actual sealing mechanism a sample was poured for casting into a stainless steel-made crucible at a central part of which a stainless steel plate was installed. Subsequently, after heated at 150° C for 75 hours, the sample was allowed to cool and an inner bottom surface of the crucible was abraded for removal of the bottom. Next, through allowing red ink to flow on the sample surface from the opening of the crucible and allowing the resulting sample to stand in the atmosphere for 16 hours and then applying a white developing solution on the exposed bottom surface of the sample, the sealing property of the sample was investigated while observing the existence or non-existence of the red ink at the contacted portions between the sample and the crucible and between the sample and the stainless steel plate. Although the test of sealing property by color check is qualitative, the precision with which the sealing property was judged was higher than that attainable with a gas-leak method as later described.

2. Gas-leak method

This method is for purpose of quantitatively measuring the sealing property. In replacement of the stainless steel plate used in the color check method, a stainless steel tube was installed within a crucible. That is, one end of the stainless steel tube is kept closed by a Bi- Sn-In-Pb alloy. First, the tube interior was vacuumized from the other end of the tube and was filled with an argon gas, and thereafter was increased up to a pressure of 1 kg/cm² (gauge pressure). Then, the resulting tube was allowed to stand and the value of pressure reduction with time was recorded.

As stated in the above item 1, the precision of judging the sealing property is higher than that attainable with the gas-leak method. The sealing property of the sample was measured by color check method, the result being classified into four types- "very good", "good", "rather bad" and "bad" and presented in Table 1 as later shown. The relationship between this measured result and the result quantitatively obtained with gas-leak method is indicated in FIG. 3.

Next, the method of testing the oxidation resistance of the sample is explained.

Oxidation test 20 grams of each sample of Bi-Sn-In-Pb alloy having various proportions of Bi, Sn, In and Pb were poured for casting into a magnetized crucible and held in the atmosphere at a temperature of 150° C for 280 hours. And the surface condition of each sample was observed. The measured result of oxidation resistance of the sample was classified into four types-a "very good" sample presenting no color variation, a "good" sample presenting little color variation, a "rather bad" sample which is a light-blackened one, and a "bad" sample which is a deep-blackened one.

The flowability test was performed together with the above-mentioned sealing property test and oxidation test, the results being shown in Table 1 below. In Table 1, sample Nos. 2 to 5, 7 to 9, 12, 13, 15 and 16 are Bi-Sn-In-Pb alloy according to the invention while sample Nos. 1, 6, 10, 11, 14, 17, 18, 19 and 20 are Bi-Sn-In-Pb alloy according to controls.

Table 1

| Sample No. | Proportion weight % | | | | Oxidation resistance | Sealing property | Fluidity |
|---|---|---|---|---|---|---|---|
| | Bi | Sn | In | Pb | | | |
| 1 | 59.5 | 35 | 5 | 0.5 | Good | Very good | Bad |
| 2 | 72 | 25 | 2 | 1 | Very good | Very good | Very good |
| 3 | 63 | 25 | 10 | 2 | " | " | " |
| 4 | 58 | 30 | 10 | 2 | " | " | " |
| 5 | 56 | 30 | 12 | 2 | " | " | " |
| 6 | 60 | 35 | 1 | 4 | " | Bad | " |
| 7 | 49 | 45 | 2 | 4 | " | Very good | " |
| 8 | 56 | 35 | 5 | 4 | " | " | " |
| 9 | 46 | 45 | 5 | 4 | " | " | " |
| 10 | 35 | 56 | 5 | 4 | Rather bad | Rather bad | " |
| 11 | 30 | 61 | 5 | 4 | " | Bad | " |
| 12 | 46 | 44 | 5 | 5 | Very good | Very good | " |
| 13 | 31 | 52 | 12 | 5 | " | " | " |
| 14 | 55 | 25 | 15 | 5 | Bad | Rather bad | " |
| 15 | 35 | 52 | 5 | 8 | Good | Good | " |
| 16 | 28 | 52 | 12 | 8 | " | " | " |
| 17 | 28 | 51 | 13 | 8 | Rather bad | Rather bad | " |
| 18 | 26 | 54 | 12 | 8 | Bad | " | " |
| 19 | 58 | 25 | 6 | 11 | " | Bad | " |
| 20 | 60 | 23 | 6 | 11 | " | " | " |

As apparent from the above Table 1, a Bi-Sn-In-Pb alloy having a proportion of 28 to 72 weight %, 25 to 52 weight %, 2 to 12 weight % and 1 to 8 weight %, respectively, is excellent in terms of any one of oxidation resistance, sealing property and fluidity. This Bi-Sn-In-Pb alloy is extremely excellent, more preferably at 31 to 72 weight %, 25 to 52 weight %, 2 to 12 weight % and 1 to 5 weight %, respectively. When a Bi-Sn-In-Pb alloy containing 1 to 8 weight % of Pb is used as a seal material, it exhibits good fluidity when molten. But, in the case of the Pb content being less than 1 weight %, the resulting alloy presents no such good fluidity, and in the case of the Pb content being more than 8 weight %, the resulting alloy decreases in terms of sealing property.

As seen from Table 1, any Bi-Sn-In-Pb alloy having an In content of 12 weight % or less exhibits excellent oxidation resistance. If, however, the In content is less than 2 weight %, the resulting sample has degraded sealing property and is unsuitable to the practical use.

As already stated, the measurement of the sealing property was made by color check method, and the relationship between this measured result and the result of the gas-leak test is shown in the graph of FIG. 2. In this graphic diagram, the marks o, Δ, ▲ and x correspond to the measured result obtained by color check method, i.e., "very good", "good", "rather bad" and "bad", respectively.

The Bi-Sn-In-Pb alloy according to the invention exhibits its effectiveness particularly when used as a seal material for sealing a rotating plug of the reactor vessel. That is, since the solidification starting point of the Bi-Sn-In-Pb alloy ranges from 95° C to 150° C, the sealing property thereof is not weakened by a temperature rise during the operation of the reactor vessel. Further, the stainless steel constituting the material of the reactor vessel, when temperature exceeds 150° C, increases in thermal stress to decrease in intensity. However, if the alloy according to the invention is used as a seal material for the rotating plug, since its solidification starting point is low, there is no necessity of heating the seal material up to such a high temperature during the rotation of the rotating plug. Accordingly, too high a stress is not applied to the stainless steel of the reactor vessel.

Note that even though incidental impurities are contained in the Bi-Sn-In-Pb alloy according to the invention, it will not depart from the scope of the invention.

Since, as above described, the Bi-Sn-In-Pb alloy according to the invention has extremely excellent sealing property and oxidation resistance and is not required to contain a large amount of expensive indium, it is very economical. For this reason, the alloy according to the invention is very suitable to the use as a seal material for sealing the rotating plug of the reactor vessel. Further, the alloy according to the invention is usable not only as a seal material for sealing a stainless steel-made vessel but also as a seal material for bonding or sealing a metallic member formed of aluminium-based alloy, copper-based alloy, etc. Furthermore, since the alloy according to the invention has low melting point and is excellent in terms of property permitting the adhesion between metallic members, it can suitably be employed as a safety valve of pressure vessel such as a pressure cooker.

What we claim is:

1. A low melting point, sealing alloy of bismuth, tin, indium and lead which consists essentially of 27 to 72 weight percent bismuth, 25 to 52 weight percent tin, 2 to 12 weight percent indium and 1 to 8 weight percent lead, said alloy being substantially resistant to atmospheric oxidation at temperatures up to 150° C.

2. An alloy of bismuth, tin, indium and lead which consists essentially of 31 to 72 weight percent bismuth, 25 to 52 weight percent tin, 2 to 12 weight percent indium and 1 to 5 weight percent lead.

* * * * *